(12) United States Patent
De

(10) Patent No.: US 6,563,812 B1
(45) Date of Patent: May 13, 2003

(54) METHOD AND APPARATUS FOR DETECTING MULTIPLE SIGNALS IN A CDMA NETWORK

(75) Inventor: Parthapratim De, Millburn, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/416,279

(22) Filed: Oct. 12, 1999

(51) Int. Cl.[7] .............................................. H04B 1/707
(52) U.S. Cl. ........................ 370/342; 370/286; 375/233
(58) Field of Search ........................... 375/233; 370/342, 370/286

(56) References Cited

U.S. PATENT DOCUMENTS

| | | | | |
|---|---|---|---|---|
| 5,799,037 A | * | 8/1998 | Strolle et al. ................ 375/233 |
| 6,215,818 B1 | * | 4/2001 | Velez et al. .................. 375/233 |
| 6,226,323 B1 | * | 5/2001 | Tan et al. ..................... 375/233 |
| 6,236,645 B1 | * | 5/2001 | Agazzi ......................... 370/286 |

* cited by examiner

Primary Examiner—Thanh Cong Le
Assistant Examiner—Alan T. Gantt
(74) Attorney, Agent, or Firm—Dirk Brinkman

(57) ABSTRACT

A receiver in a code-division-multiple-access network includes a forward detector, a first feedback detector, a set of second feedback detectors, a slicer and an arithmetic logic unit for detecting each one of the multiple transmitted signals. The forward detector has an input connected to receive the sum of the multiple transmitted signals. The arithmetic logic has an input connected to an output of the forward detector. The slicer has an input connected to an output of the arithmetic logic unit. The first feedback detector has an input connected to an output of the slicer and an output is connected to the input of the arithmetic logic unit. Each of the second feedback detectors has an input connected to the output of a slicer for each of the other slicers and an output is connected to the input of the arithmetic logic unit. The output of the slicer provides the detected signal, for each transmitter.

8 Claims, 5 Drawing Sheets

METHOD AND APPARATUS FOR DETECTING MULTIPLE SIGNALS IN A CDMA NETWORK

FIELD OF THE INVENTION

The invention relates generally to code-division-multiple-access (CDMA) networks, and more particularly to detecting multiple signals in a channel subject to multi-access interference, multi-path fading, and varying power levels of transmitters.

BACKGROUND OF THE INVENTION

There is a significant interest in designing code-division multiple-access (CDMA) spread spectrum networks that allow data rates on the order of ten's of megabits per second, or even higher asynchronous rates. For example, there is a demand for very high speed wireless networks to support multi-media applications. In a code-division multiple-access (CDMA) network, multiple transmitters share a common channel by modulating a set of signature waveforms.

Some of these networks are based on an interim standard, see "EIA/TIA/IS-95 Mobile Station-Base Station Compatibility Standard for Dual-Mode Wideband Spread Spectrum Cellular System," Telecommunications Industry Association, July 1993. For digital signals, direct sequence (DS) coding is typically used to achieve spread spectrum coding.

In DS coding, the data (symbols) are mixed with a very high rate coding signal. Typically, the DS coding signal is generated by a pseudo-random code generator. The amount of spectrum spreading achieved is simply the ratio of the code rate to the data rate. The code rate is also known as the "chip rate." Twice the chip rate doubles the occupied spectrum of the DS transmitted signal. The duration of a chip sequence Tc is related to the symbol interval T by Tc=T/N.

In a CDMA network, receivers observe the sum of the transmitted signals, plus any noise. Multiple-access deals with detecting mutually interfering digital signals. Sometimes, the superposition of the signals sent by different transmitters occurs unintentionally due to non-linear effects, such as, cross-talk in telephony and multi-track magnetic recording, and when the same radio frequency band is used simultaneously by multiple transmitters as in cellular telephony, personal communications services (PCS), digital television (DTV) broadcasting, and wireless local loops (WLL).

Many wireless systems operate under highly dynamic conditions due to the mobility of the transmitters, varying environmental conditions, and the random nature of channel access. Detecting signals at a base station of a wireless system, encounters many difficulties. For example, high speed CDMA networks suffer from multi-access interference, multi-paths and echoes.

In terrestrial Digital TV (DTV) transmission with a single transmitter sending symbols at a rate of 10.76 Mbits per second, echoes with delays of more than thirty microseconds can interfere with the main signal. This is referred to as a fading channel. This means that equalizers with several hundreds of taps are required. In the multi-user scenario, the base station has to detect the data streams of multiple transmitters from the combined received data stream. This is referred to as multi-access interference between different transmitters (or users).

This interference problem assumes more serious proportions in cellular networks. Due to the mobility of the transmitters, signal strength varies. The strength of the signal from a transmitter closer to a base station is stronger than the signal from a transmitter further away. The signals from the closer transmitter can completely overpower the weaker signal. This is the so-called near-far problem.

The near-far problem can be avoided by power control. The basic idea of power control is to provide feedback to mobile transmitters to control their transmitted power levels to yield equal power at the receiver from all mobile transmitters. Some work has focussed on looking at the signal strengths of the different transmitters. Stronger transmitters make their decisions first, and these decisions can be used in a successive cancellation method.

Prior art multiple-access detector methods are computationally intensive. As the number of transmitters increases, the computational complexity of receivers will increase exponentially. This renders these methods impractical for implementation in a base station which is expected to concurrently serve tens of transmitters.

Wang et al. in "Blind Equalization and Multi-user Detection in Dispersive CDMA Channels," IEEE Transaction Communications, Vol.46, No. 1, 1998, deals with multi-access interference mitigation. They describe the similarity in a mathematical framework between channel equalization and multi-user detection. Their model for multi-user detection in dispersive CDMA channels uses a least squares method and adaptive signal processing.

U.S. patent application Ser. No. 09/262,377, entitled "Method and Apparatus for Equalizing a Digital Signal Received via Multiple Transmission Paths" filed by Bao et al. on Mar. 4, 1999 describe a decision feedback equalizer (DFE) that exploits the sparse channel characteristics of terrestrial digital television transmission. A least mean square (LMS) method is used for updating equalizer tap coefficients. Only taps with substantial energy and their neighboring taps are updated.

It is desired to provide a method and apparatus for detecting individual transmitted signals in a CDMA network channel that is subject to multi-access interference between users with varying power levels, multi-path fading and echoes.

SUMMARY OF THE INVENTION

The invention provides a method and apparatus for receiving signals in a network configured with code division multiple-access (CDMA ) channels. The receiver according to the invention improves performance in very high speed wireless channels used for multimedia applications such as digital video.

Multipaths and echoes with very long delays are cancelled at high data rates. Signals received from multiple transmitters are detected even when the signals have varying signal strengths. The method according to the invention exhibits superior performance and provides robustness in noisy channels. The method also reduces the number of detector taps that need to be updated.

Examples of multi-access applications which can use the invention include mobile telephony, satellite communications, multidrop telephone lines, local area networks, packet-radio networks, interactive cable television networks, and fixed wireless local loops.

More particularly, the invention provides a receiver in a code-division-multiple-access network. In general, the receiver includes a forward detector, K feedback detectors, where K is the number of transmitters, a slicer and an arithmetic logic unit for each one of multiple transmitted signals. The forward detector has an input connected to receive the combination of the multiple transmitted signals and noise. The arithmetic logic has an input connected to an output of the forward detector.

The slicer has an input connected to an output of the arithmetic logic unit. A first feedback detector has an input connected to an output of the slicer and an output is connected to the input of the arithmetic logic unit. Each of the other K−1 feedback detectors has an input connected to the output of the slicers for each of the other slicers and an output is connected to the input of the arithmetic logic unit. The output of the slicer provides the detected signal for each transmitter.

DETAILED DESCRIPTION OF THE PREFERRED EMBODIMENTS

Spread Spectrum Channel

Figure 1:
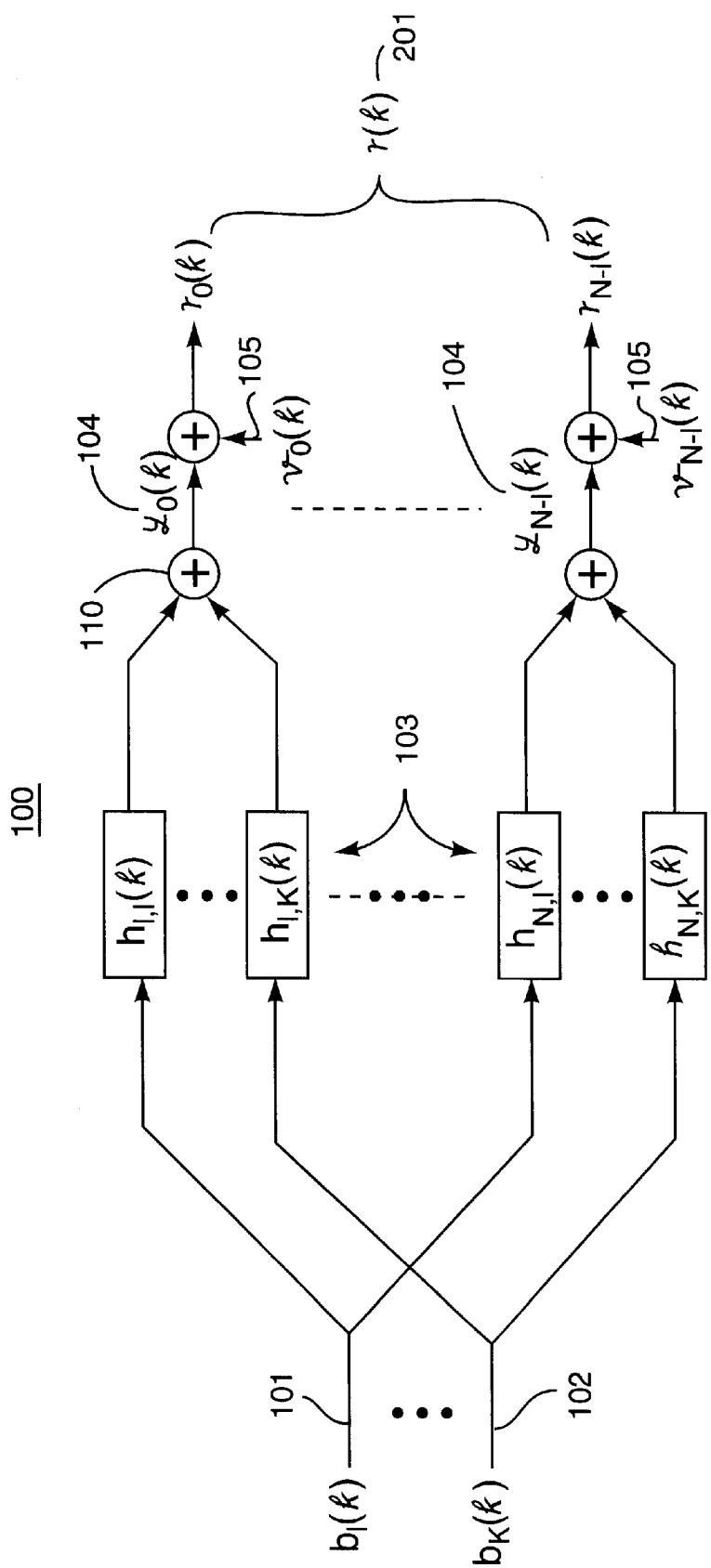
FIG. 1 is a diagram of a spread-spectrum channel.

FIG. 1 shows a multi-user CDMA spread spectrum channel 100 with multiple paths that can use the detector of my invention. The number of transmitters is K and the processing gain is N. In FIG. 1, $b_1(k)$ denotes the transmitted data stream (symbols) 101 of transmitter 1, and $b_K(k)$ is the transmitted data stream 102 of transmitter K, where k is a particular time interval. The channel impulse response 103 for the l th transmitter and the jth chip interval at time k is $h_{j,l}(k)$. The signals are combined 110 to form signal $y_j(k)$ 104 plus noise $v_j(k)$ 105 to produce the total signal $r_j(k)$ 201 on the channel 100.

Decision Feedback Detector

Figure 2:
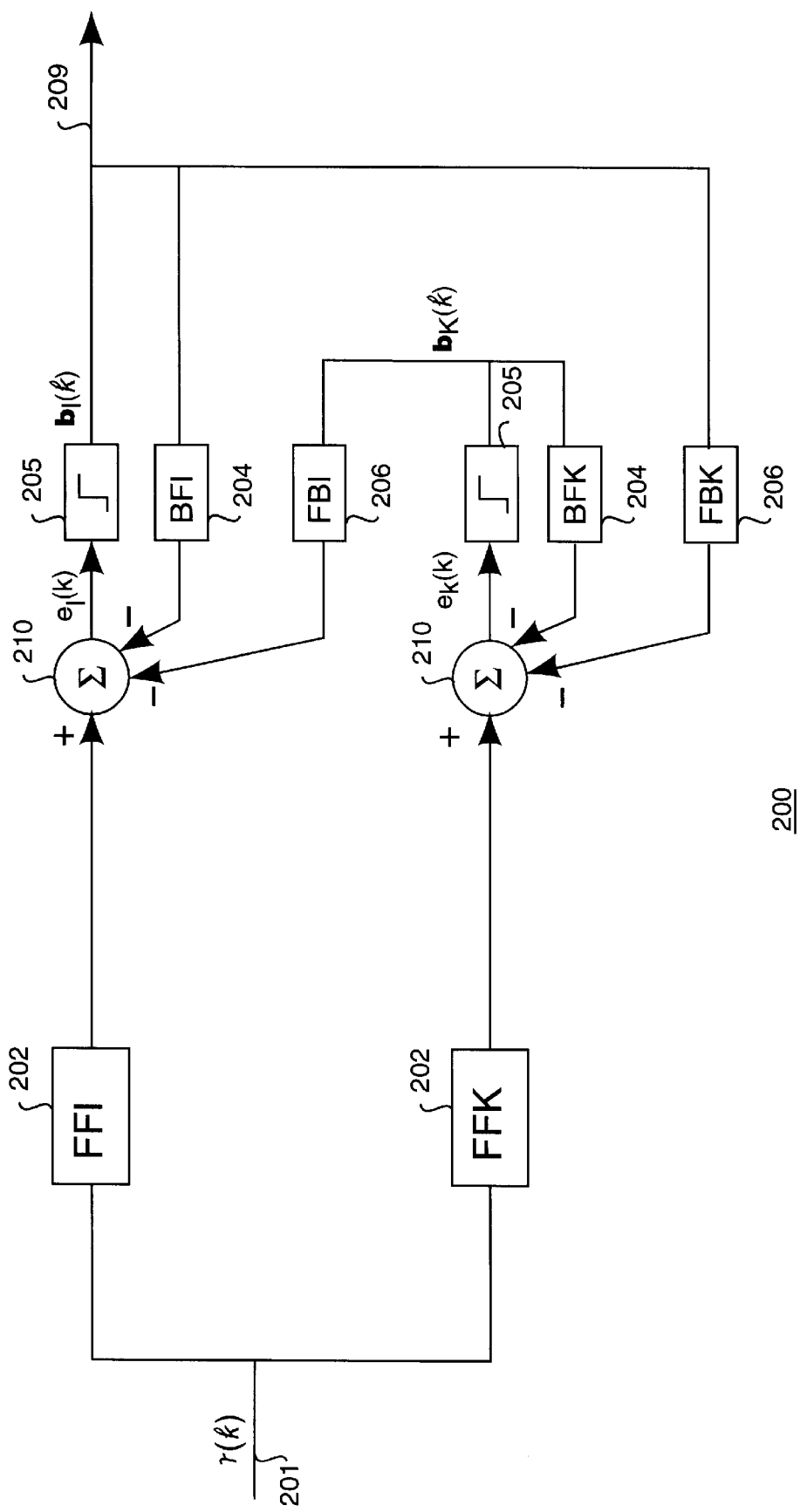
FIG. 2 is a block diagram of a receiver according to the invention.

FIG. 2 shows a decision feedback receiver 200 according to my invention. The receiver 200 as described: herein has a lower steady state mean squared error and faster convergence speed than prior art receivers. In one embodiment, the receiver is located in a base station in a cell of a cellular telephone network. In another embodiment, the receiver is a satellite ground station.

The receiver 200 processes input signals r(k) 201 of the channel 100 of FIG. 1 to detect symbols $b_j(k)$ 209 for the jth transmitted signal $b_j(k)$. My receiver 200 includes one forward detector (FF1, . . . , FFK) 202 for each of the K transmitters. Each forward detector 202 includes multiple N-dimension taps with weights:

$$(w_f)_j(k)=[(w_{f,0})_j(k), (w_{f,1})_j(k), \ldots, (w_{f,N-1})_j(k)]^T$$

for each jth transmitter at time delay k. The outputs $e_j(k)$ of the forward detectors are respectively presented to slicers 205.

The receiver 200 also includes one feedback detector BFj 204 for each of the K transmitters. These detectors feedback via arithmetic logic units 210. The taps of the feedback detectors have weights $(w_b)_j$. Feedback detectors FBj 206 also feedback to other transmitters via arithmetic logic units 210. The detectors 206 have taps with weights $(f_b)_j$. This arrangement enables a particular transmitter's previously detected symbols to be used during decoding. In addition, my detector uses previously detected symbols of other transmitters.

Figure 5:
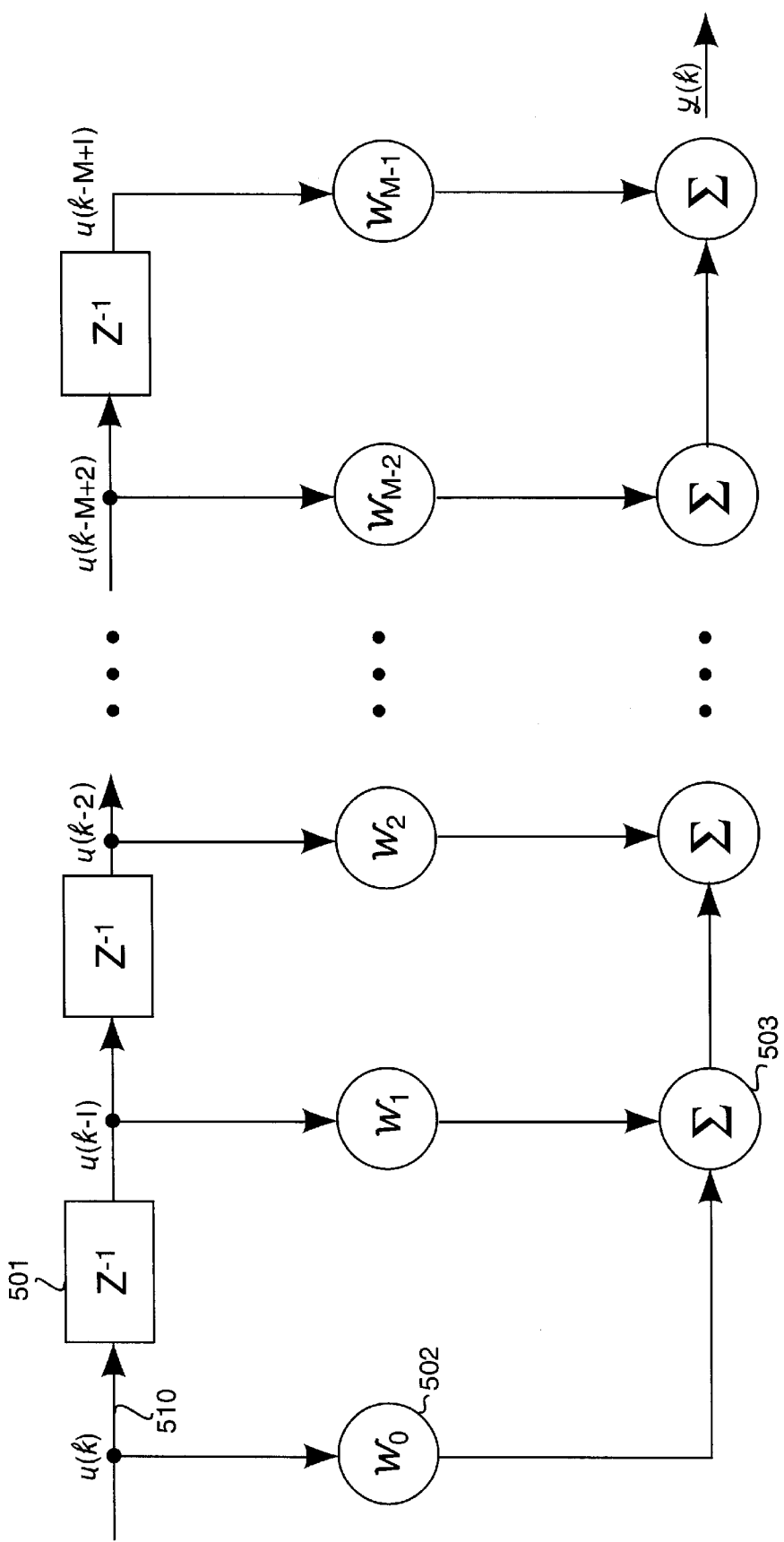
FIG. 5 is a schematic of a detector with multiple taps.

FIG. 5 shows the configuration of the transversal (tapped delay line) 500 considered here. The detector 500 includes delays ($z^{-1}$) 501, weights ($w_m$) 502, and accumulators ($\Sigma$) 503. The detectors 202, 204, and 206 vary from the generic detector only in the number of taps and the value of tap weights. The signal u(k) 510 is the input to the detector, and y(k) is the output, where:

$$y(k)=w_0 u(k)+w_1 u(k-1)+w_2 u(k-2)+ \ldots w_{M-1} u(k-M+1)$$

and the weights can be positive or negative.

According to my invention, only selected forward and feedback detector taps are used while forming decoding decisions for a particular transmitter. I employ a subspace based approach on the decision feedback topology to determine which of the particular forward detector taps, as well as, which other transmitters, and which of their previously detected symbols are used to decode a particular transmitter's data. I call this selective updating (or "windowing") on the detector taps.

Because I only update a small number of the forward and feedback taps, the computational complexity of my detector is substantially reduced over those known in the prior art. This is particularly true, when the detector encounters multipaths with very long delays, and when there is a wide variation in the signal strengths of different transmitters. By employing this methodology, the receiver 200 according to my invention can process noisy, fading channel for very high speed applications. In addition, I reduce the near-far problem by separating transmitters with strong signals, which act as strong interferers, from transmitters with weak signals.

The overall effect is a reduced steady state mean squared error at the output of the receiver, and faster convergence speed. As a consequence, my invention can detect signals received from a greater number of transmitters than prior art detectors.

Subspace Based Updating

I employ a subspace based approach in the receiver 200 to determine which of the jth transmitter's forward detector taps to use during the decoding of the jth transmitter's data. The same approach is also used for decoding the data of other transmitters. I refer to this as selective updating (or "windowing") on the detector taps. Windowing provides improved performance because subspace approaches reject noise only modes.

The received signal vector r(k) 201 is the N-dimensional vector:

$$[r_0(k), r_1(k), \ldots, r_{N-1}(k)]^T$$

plus the noise vector:

$$[v_0(k), v_1(k), \ldots, v_{N-1}(k)]^T 105.$$

I define the N-dimensional vector $s^T_j(k)=(w^T_f)_j(k)*H(k)$, where * is the convolution operator, and H(k) is a multi-access channel which accounts for multi-access interference between different transmitted signals.

If $e_j(k)$ is the input signal to the slicer 205, then the error signal, $e_j(k)$ for decoding the data of the jth transmitter is given by $e_j(k)-b_j(k)$, assuming that all previously detected symbols for all transmitters are correct. The error energy $E[(e_j(k))^2]$ is the criterion which I minimize. The error energy can be minimized by setting the weight parameter of the taps of the feedback-detectors as:

$$(w_b)_j(k)=s_{jj}(k)=(w_f)^T_j(k)*h_{.j}(k),$$

and $$(f_b)_K(k) = s_{jK}(k) = (w_f)_j^T(k) * h_{*j,K}(k)$$

where $h_{*j}(k)$ is the jthe column of $H(k)$.

I minimize the error energy with respect to the N-dimensional forward detector taps $(w_f)_j(k)$. I solve for the optimal forward detector parameters of my subspace-based decision-feedback detector as follows.

Figure 3:
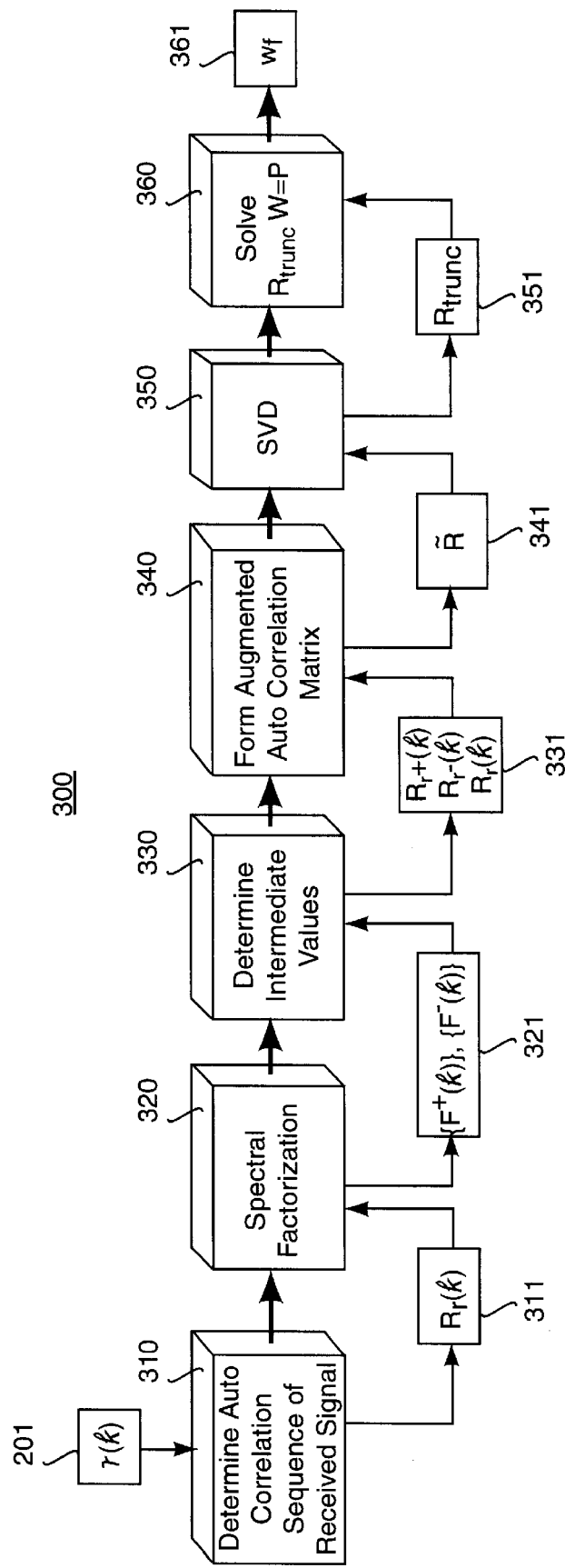
FIG. 3 is a flow diagram of a first method for updating detector tap weights.

FIG. 3 illustrates a first method 300 for solving for the detector parameters. For the received signal in each chip sequence in a symbol interval T, step 310 determines its autocorrelation matrix $R_r(k)$ 311.

Step 320 performs a spectral factorization of the autocorrelation matrix to obtain two sequences $\{F^+(k)\}$ and $\{F^-(k)\}$ 321.

These two sequences are used to determine intermediate sequences $\{R_{r+}(k)\}$ and $\{R_{r-}(k)\}$ 331 in step 330, the values 331, along with $\{R_r(k)\}$, are used to form an augmented autocorrelation matrix $\check{R}$ 341 in step 340.

In step 350, a singular value decomposition (SVD) is applied to $\check{R}$ determine its portion, corresponding to significant energy, $R_{trunc}$ 251.

Then, in step 360, I solve fort W:

$$R_{trunc} W = p$$

where W contains the optimal values of the weights of the forward detector taps $(w_f)$ 361 for decoding the data of all the different transmitters, and where p is the crosscorrelation between the received data 201 and training data for all transmitters.

Since each element of $R_{trunc}$ 251 includes information on all transmitters, the SVD 350 of the entire augmented autocorrelation matrix 341 not only determines where the multipath is distributed, but also takes into account the strengths of all transmitters' signals to determine which can be used in decoding jth transmitter's data.

In the above subspace based updating method, the selective updating is applied to the taps of the forward detectors 202 only. Only selected forward detector taps are updated, particularly, only those taps with significant signal energy. This is determined, in a combined way, for all the transmitters' forward detector taps. Other forward detector taps, with lesser energy, are not updated, leading to improved performance by rejecting noise, as well as taking into account the signal strength of different transmitters.

Alternative Subspace Based Updating

Figure 4:
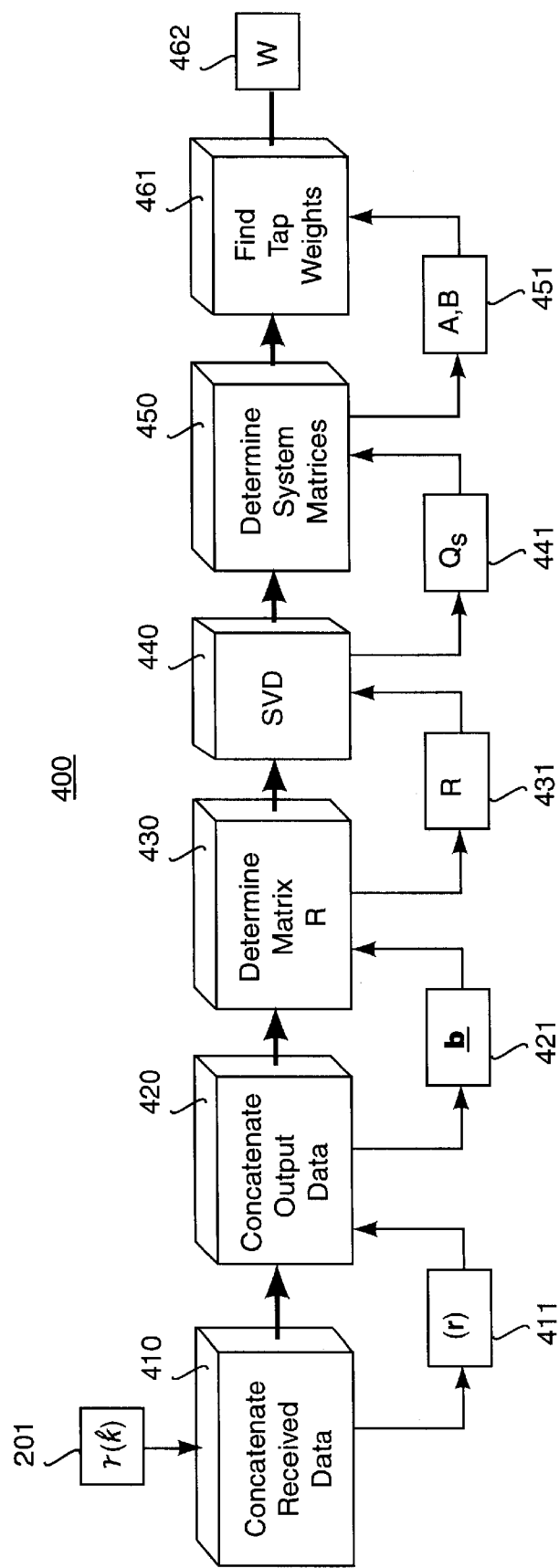
FIG. 4 is a flow diagram of a second method for updating detector tap weights.

An alternative method 400, shown in FIG. 4, also selectively updates the taps of the feedback detector BFj 204 of the jth transmitter, and the feedback detectors FBk 206 of other transmitters, in addition to selectively updating forward detector taps. By selective updating, I mean that only certain weights in the detector structure, as shown in FIG. 5, are used to computer y(k). The other weights are set to zero. This method does not assume that all prior decisions of the slicer 205 for each transmitter 1, ..., j, ..., K are correct. In other words, all detector taps weights $(w_b)_j(k)$ and $(f_b)(k)$ are selectively updated.

The previous method assumed that all prior slice decisions were correct and therefore updated all feedback detector taps, and selective updating was applied to forward detector taps only. In the alternative method described here, selective updating is employed on all the detector taps.

However, decision feedback detectors are notorious for error propagation. Incorrect decisions at the output of the slicer 205 for the jth transmitter will be fed back through the feedback detector. In multi-user detection, this problem is aggravated, as incorrect decisions of jth transmitter's data are also fed back in detecting other transmitters' data. This may make multi-user detection and multipath mitigation, at the base station, very difficult.

Therefore, I selectively update the weights $(w_b)_j(k)$ and $(f_b)(k)$ of the feedback detector taps to reduce error propagation. Also, I take into account the difference in the transmitter's signal strengths while determining which other transmitters' detected signals, and which of their previously detected symbols are used by the receiver to decode the jth transmitter's data.

This is achieved by applying the subspace (or windowing) approach to the forward detector taps, as well as the weights $(w_b)_j(k)$ and $(f_b)(k)$ of the feedback detector taps 204 and 206 in a combined manner to achieve superior multi-user detection and multipath mitigation. The alternative multi-user detector described here treats the decision-feedback detector as an infinite response filter (IIR), or a system identification problem.

For the circuit of FIG. 2, with $r(k)$ 201 as the N-dimensional received data vector (which includes noise), and $b_j(k)$ 209 as the detected symbol for the jth transmitter, if $e_j(k)$ is the input into the slicer 205 for the jth transmitter, then the error signal for the jth transmitter is defined as the difference between the input and output of its slicer $e_j(k)-b_j(k)$. As discussed above, the previous updating method assumes that all prior slicer decisions were correct. This allowed the mean squared error energy to be expressed in terms of forward detector taps only. The subsequent application of subspace approach performs a selective updating on the forward detector taps only.

In this alternative embodiment, I do not assume that all prior decisions were correct. The entire dynamics of the decision-feedback detector is captured by treating it as an infinite impulse response (IIR) system. The system is then put in a multi-input, multi-output state space representation, involving both forward and feedback detector taps. The subsequent application of subspace approach performs a selective updating on both forward and feedback detector taps.

As shown in FIG. 4, the method 400 has N inputs. The number of outputs, as shown in FIG. 2, is the number of transmitters of the system.

Step 410 forms concatenated received data (r) 411 from the received signal r(k) 201 at time instants (k−M), r(k−M), to (k−1), r(k−1).

The output of the detector, b(k) at time instant k, is of a length equal to the number of transmitters being served. Step 420 forms the concatenated output data vector b(k), from b(k), at time intervals (k−M) to (k−1).

Step 430 computes a matrix R, formed from correlations (auto-correlations and cross-correlations) between the received data vector and an output data vector of the detector 200. $R = R_b - (R_{br} R_r^{-1} R_{rb})$, i.e. the product of the last three matrices is subtracted from the first matrix. The matrix $R_b$ is the autocorrelation matrix of the concatenated output of the detector 204, $R_r^{-1}$ is the inverse of the autocorrelation matrix of the received signal, $R_{br}$ and $R_{rb}$ are the cross-correlations between the received signal (at the base station) and the output of the detector.

Step 440 applies a singular value decomposition to R 431 to determine its significant (or principal) eigen-vectors $(Q_s)$ 441.

Step 450 determine system matrices A and B of the state space representation. The matrix A is determined by solving the equations $Q_s(2:M) = Q_s(1:M-1)A$, where $Q_s(2:M)$ is the portion of the $Q_s$ matrix, from row number 2 to row number M, and $Q_s(1:M-1)$ is the portion of the $Q_s$ matrix, from row number 1 to row number (M−1). The matrix B of the state space representation can be solved using Viberg's method as described in "Subspace Methods in System Identification," Proc. 10th IFAC Symposium on System Identification, vol. 1, 1994.

Step 460 first finds the weights (w) 461 for the taps of the forward detectors 202, and second the weights of two sets of feedback detectors 204 and 206. The weights of the feedback detectors 204 and 206 of the jth transmitter are found in the Mth column of matrix A. For the Kth transmitter, the weights of the taps of the feedback detectors 204 and 206 can be determined from the 2Mth column of matrix A. The weights of the taps of the forward detector of the jth and Kth transmitter can be obtained from matrix B.

Following the description contained herein, it should be apparent that other subspace based system identification methods can be applied to the multi-user detection, to obtain better performance and robustness.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. An apparatus for detecting multiple transmitted signals in a code-division-multiple-access network, for each one of the multiple transmitted signals the apparatus comprises:
   a forward detector having an input connected to receive the multiple transmitted signals;
   an arithmetic logic having an input connected to an output of the forward detector;
   a slicer having an input connected to an output of the arithmetic logic unit;
   a first feedback detector having an input connected to an output of the slicer and having an output connected to the input of the arithmetic logic unit; and
   a set of second feedback detectors having each input connected to the output of the slicers for detecting each of the other transmitted signals and having each output connected to the input of the arithmetic logic unit, the output of the slicer providing a detected value of a particular transmitted signal.

2. The apparatus of claim 1 wherein each of the detectors is configured as a delay line with a plurality of taps, each of the taps having an associated adjustable weight.

3. The apparatus of claim 1 wherein the arithmetic logic unit subtracts the output of the first detector and the set of second feedback detectors from the output of the forward detector.

4. The apparatus of claim 2 wherein the weights of the forward detector are selectively updated while detecting multiple transmitted signals.

5. The apparatus of claim 4 wherein the selectively updating further comprises:
   means for determining an autocorrelation sequence of a received signal;
   means for performing spectral factorization of the autocorrelation sequence to obtain two sequences;
   means for determining intermediate sequences from the two sequences;
   means for forming an augmented autocorrelation matrix from the intermediate sequences and the autocorrelation sequence of the received signal;
   means for performing a singular value decomposition of the augmented autocorrelation matrix to obtain a significant portion; and
   means for solving for weights of the forward detector using the significant portion of the augmented autocorrelation matrix and training data.

6. The apparatus of claim 2 wherein the weights of both the forward and feedback detectors are selectively updated while detecting the multiple transmitted signals.

7. The apparatus of claim 6 wherein the adjusting further comprises:
   means for forming a concatenated received signal;
   means for forming a concatenated output signal of the detector;
   means for determining a matrix from correlations between a received signal and an output signal of the detector;
   means for performing a singular value decomposition of the matrix to obtain significant eigen-vectors;
   means for determining system matrices for a signal state space using the above eigen-vectors; and
   means for locating weights in the system matrices.

8. A method for detecting multiple transmitted signals in a code-division-multiple-access network, the method for each one of the multiple transmitted signal comprising the steps of:
   receiving a sum of multiple transmitted signals to the forward detector;
   providing an output of the forward detector to an arithmetic logic;
   slicing an output of the arithmetic logic unit in a slicer;
   providing an output of the slicer to a first feedback detector connected to the input of the arithmetic logic unit; and
   providing outputs of all other slicers and all other first feedback detectors to a set of second feedback detectors having outputs connected to the input of the arithmetic logic unit, the output of the slicer providing a detected value of a particular transmitted signal.

* * * * *